United States Patent [19]

Brod et al.

[11] Patent Number: 5,494,967
[45] Date of Patent: Feb. 27, 1996

[54] OIL ADDITIVES AND COMPOSITIONS

[75] Inventors: Ramah J. Brod, Abingdon; Brian W. Davies, Blewbury; Tuncel Ibrahim, Abingdon, all of United Kingdom

[73] Assignee: Exxon Chemical Patents Inc., Linden, N.J.

[21] Appl. No.: 360,668

[22] PCT Filed: Jun. 29, 1993

[86] PCT No.: PCT/EP93/01667

§ 371 Date: Dec. 21, 1994

§ 102(e) Date: Dec. 21, 1994

[87] PCT Pub. No.: WO94/00516

PCT Pub. Date: Jan. 6, 1994

[30] Foreign Application Priority Data

Jun. 30, 1992 [GB] United Kingdom .................. 9213909

[51] Int. Cl.$^6$ ............................ C08L 33/04; C10L 1/18
[52] U.S. Cl. ............................ 525/222; 44/393; 525/61
[58] Field of Search ........................ 525/222, 61; 44/393

[56] References Cited

U.S. PATENT DOCUMENTS

| | | | |
|---|---|---|---|
| 3,961,916 | 6/1976 | Ilnyckyj et al. | 44/62 |
| 3,985,719 | 10/1976 | Hoyt et al. | 526/10 |
| 4,575,531 | 3/1986 | Hoyt et al. | 525/354 |

FOREIGN PATENT DOCUMENTS 0113581  7/1984  European Pat. Off. .

Primary Examiner—Thomas Hamilton, III
Attorney, Agent, or Firm—John J. Mahon

[57] ABSTRACT

Compositions comprising two or more re-esterified ethylene-unsaturated ester copolymers, for example ethylene-vinyl acetate copolymers, improve the low temperature properties of fuel oils.

6 Claims, No Drawings

OIL ADDITIVES AND COMPOSITIONS

This invention relates to oil compositions, primarily to fuel oil compositions, and more especially to fuel oil compositions susceptible to wax formation at low temperatures, and to additive compositions for such fuel oil compositions.

Heating oils and other distillate petroleum fuels, for example, diesel fuels, contain alkanes that at low temperature tend to precipitate as large crystals of wax in such a way as to form a gel structure which causes the fuel to lose its ability to flow. The lowest temperature at which the fuel will still flow is known as the pour point.

As the temperature of the fuel falls and approaches the pour point, difficulties arise in transporting the fuel through lines and pumps. Further, the wax crystals tend to plug fuel lines, screens, and filters at temperatures above the pour point. These problems are well recognized in the art, and various additives have been proposed, many of which are in commercial use, for depressing the pour point of fuel oils. Similarly, other additives have been proposed and are in commercial use for reducing the size and changing the shape of the wax crystals that do form. Smaller size crystals are desirable since they are less likely to clog a filter; certain additives inhibit the wax from crystallizing as platelets and cause it to adopt an acicular habit, the resulting needles being more likely to pass through a filter than are platelets. The additives may also have the effect of retaining in suspension in the fuel the crystals that have formed, the resulting reduced settling also assisting in prevention of blockages.

Effective wax crystal modification (as measured by CFPP and other operability tests, as well as simulated and field performance) may be achieved by ethylene-vinyl acetate or propionate copolymer (EVAC or EVPC)-based flow improvers.

In EP-A-45342 is described a cold flow additive, based on an EVAC modified by esterification with 2-ethylhexanoic, acrylic, and phthalic acids.

In "Wissenschaft und Technik" 42(6), 238 (1989), M. Ratsch & M. Gebauer describe cold flow additives including an EVAC esterified with, inter alia, n-hexanoic acid.

In U.S. Pat. No. 3,961,916, middle distillate flow improvers are described which comprise a wax growth arrestor and a nucleating agent, the former being preferably a lower molecular weight ethylene-vinyl ester copolymer with a higher ester content, the latter preferably a higher molecular weight copolymer with a lower ester content, the esters preferably, but not necessarily, both being vinyl acetate.

In DE-AS-2407158, middle distillate flow improvers are described, comprising a mixture of low molecular weight ethylene-vinyl ester and ethylene-acrylic acid ester copolymers, both containing at least 40 mole per cent of the ester component.

It has been observed that, in many oils, a blend of two different ethylene-vinyl ester copolymers at a given total concentration gives a greater reduction in CFPP than that achieved by the same concentration of either copolymer alone, even when the two copolymers are formed from ethylene and the same vinyl ester, e.g., vinyl acetate, and even when the number average molecular weights and the ester contents of the two copolymers are similar. This effect appears to be different from the effect observed in U.S. Pat. No. 3,961,916, mentioned above, where an improvement results from the combination of copolymers with differing molecular weights and ester contents.

The present invention is concerned to provide an oil, especially a fuel oil, additive effective to improve low temperature flow of the oil, and is based on the further observation that if a first ethylene-vinyl ester copolymer is hydrolysed and re-esterified with the same acid, and the same procedure is adopted with a second ethylene-vinyl ester copolymer, the blend of the two re-esterified copolymers is more effective as a low temperature flow improver than a blend of the original copolymers used at the same concentration. This applies both when the two starting copolymers have similar molecular weights or very different molecular weights, and surprisingly the improvement may also be observed even when individually each re-esterified copolymer is less effective than its precursor.

In this specification, the term "re-esterified copolymer" is used to refer to an ethylene-vinyl ester copolymer that has been at least partially hydrolysed to remove acid groups, and treated with the same acid to restore at least partially the ester groups.

The present invention accordingly provides a composition comprising at least two different oil soluble re-esterified ethylene-vinyl ester copolymers.

The invention also provides a composition comprising an oil and at least two different re-esterified ethylene-vinyl ester copolymers.

The invention further provides the use of a composition comprising at least two different oil soluble re-esterified ethylene vinyl ester copolymers to improve the low temperature properties of an oil.

The invention still further provides an additive concentrate containing the composition of the invention in admixture with an oil or a solvent miscible with oil.

Each copolymer advantageously contains, in addition to units derived from ethylene, units of the formula

$$—CH_2CROOCR^1— \qquad \text{I}$$

wherein R represents H or CH, preferably H, and $R^1$ represents a hydrocarbyl group.

As used in this specification the term "hydrocarbyl" refers to a group having a carbon atom directly attached to the rest of the molecule and having a hydrocarbon or predominantly hydrocarbon character. Among these, there may be mentioned hydrocarbon groups, including aliphatic, (e.g., alkyl or alkenyl), alicyclic (e.g., cycloalkyl or cycloalkenyl), aromatic, aliphatic and alicyclic-substituted aromatic, and aromatic-substituted aliphatic and alicyclic groups. Aliphatic groups are advantageously saturated. These groups may contain non-hydrocarbon substituents provided their presence does not alter the predominantly hydrocarbon character of the group. Examples include keto, halo, hydroxy, nitro, cyano, alkoxy and acyl. If the hydrocarbyl group is substituted, a single (mono) substituent is preferred. Examples of substituted hydrocarbyl groups include 2-hydroxyethyl, 3-hydroxypropyl, 4-hydroxybutyl, 2-ketopropyl, ethoxyethyl, and propoxypropyl. The groups may also or alternatively contain atoms other than carbon in a chain or ring otherwise composed of carbon atoms. Suitable hetero atoms include, for example, nitrogen, sulfur, and, preferably, oxygen. Advantageously, the hydrocarbyl group contains at most 30, preferably at most 15, more preferably at most 10 and most preferably at most 8, carbon atoms.

Advantageously, R represents H. $R^1$ advantageously represents an alkenyl or as indicated above, preferably, an alkyl group, which is advantageously linear. If the alkyl or alkenyl group is branched, for example, as in the 2-ethylhexyl group, the α-carbon atom is advantageously part of a methylene group. Advantageously, the alkyl or alkenyl group contains up to 30 carbon atoms, preferably from 1 (2 in the case of alkenyl) to 14 carbon atoms, and more preferably from 1 to 7 carbon atoms. As examples of alkyl or alkenyl groups there may be mentioned propyl, n-butyl, iso-butyl, and isomers, preferably the linear isomers, of pentyl, hexyl, heptyl, octyl, nonyl, decyl, undecyl, dodecyl, tridecyl, tetradecyl, pentadecyl, hexadecyl, heptadecyl, octadecyl, nonadecyl and icosyl, and their corresponding alkenyl, advantageously alk-omega-enyl, radicals. Preferably, however, $R^1$ represents methyl, i.e., the polymer is an ethylene-vinyl acetate copolymer.

As cycloalkyl, alkaryl and aryl radicals, there may be mentioned, for example, cyclohexyl, benzyl and phenyl.

The copolymer or copolymers may also contain units of formulae other than those mentioned above, for example units of the formula $$-CH_2-CRR^2- \quad\quad\quad II$$

where $R^4$ represents —OH, or of the formula $$-CCH_3(CH_2R^3)-CHR^4- \quad\quad\quad III$$

where $R^3$ and $R^4$ each independently represent hydrogen or an alkyl group with up to 4 carbon atoms, the units III advantageously being derived from isobutylene, 2-methylbut-2-ene or 2-methylpent-2-ene.

The ester units in the two re-esterified copolymers may be the same or different. If they are the same, e.g., as in the preferred embodiment, both acetate units, then the polymers must differ in some other respect, for example molecular weight, molecular weight distribution, the proportion of ester units in the polymer, or the presence of other units in the chain.

The ester-containing units of the re-esterified polymer, more especially the units of Formula I, advantageously represent from 0.3 to 35 molar percent of each re-esterified polymer. As indicated above, the invention is applicable to combinations of polymers with similar molecular weights and proportions of ester units as well as to combinations in which these characteristics differ. The composition may comprise one polymer of type (i), in which the ester groups advantageously constitute from 7.5 to 35 molar percent, preferably from 10 to 25, and more preferably from 11 to 16, molar per cent, in admixture with a copolymer of type (ii) in which the ester groups advantageously represent up to 10, more advantageously from 0.3 to 7.5, and preferably from 3.5 to 7.0 molar percent. The composition may instead contain two polymers (i) or two polymers (ii). It is also within the scope of the invention to employ a composition containing the starting polymers, or other cold flow additives, as will be described below.

The copolymer (i) advantageously has a number average molecular weight, as measured by gel permeation chromatography, of at most 14,000, advantageously at most 10,000, more advantageously in the range of 1,400 to 7,000, preferably 2,000 to 5,500 and most preferably about 4,000. For the polymer (ii) the number average molecular weight is advantageously at most 20,000, preferably up to 15,000 and more preferably from 1,200 to 10,000, and most preferably from 3,000 to 10,000. If the composition comprises polymers (i) and (ii), the number average molecular weight of the polymers (ii) is advantageously greater, by at least 500, and preferably at least 1,000, than that of polymer (i).

The oil may be a crude oil, i.e. oil obtained directly from drilling and before refining.

The oil may be a lubricating oil, which may be an animal, vegetable or mineral oil, such, for example, as petroleum oil fractions ranging from naphthas or spindle oil to SAE 30, 40 or 50 lubricating oil grades, castor oil, fish oils or oxidized mineral oil. Such an oil may contain additives depending on its intended use; examples are viscosity index improvers such as ethylene-propylene copolymers, succinic acid based dispersants, metal containing dispersant additives and zinc dialkyldithiophosphate antiwear additives. The compositions of this invention may be suitable for use in lubricating oils as flow improvers, pour point depressants or dewaxing aids.

The oil may be a fuel oil, especially a middle distillate fuel oil. Such distillate fuel oils generally boil within the range of from 110° C. to 500° C., e.g. 150° to 400° C. The fuel oil may comprise atmospheric distillate or vacuum distillate, or cracked gas oil or a blend in any proportion of straight run and thermally and/or catalytically cracked distillates. The most common petroleum distillate fuels are kerosene, jet fuels, diesel fuels, heating oils and heavy fuel oils. The heating oil may be a straight atmospheric distillate, or it may contain minor amounts, e.g. up to 35 wt %, of vacuum gas oil or cracked gas oils or of both. The above-mentioned low temperature flow problem is most usually encountered with diesel fuels and with heating oils. The invention is also applicable to vegetable-based fuel oils, for example rape seed oil.

The additive composition should preferably be soluble in the oil to the extent of at least 1000 ppm by weight per weight of oil at ambient temperature. However, at least some of the additive may come out of solution near the cloud point of the oil and function to modify the wax crystals that form.

In the composition according to the invention, the linearity of the polymers as expressed by the number of methyl groups per 100 methylene units, as measured by proton NMR, is advantageously from 1 to 15.

The precursor copolymers, especially an ethylene-vinyl acetate copolymer, may be made by any of the methods known in the art, e.g., by solution polymerization with free radical initiation, or by high pressure polymerization, conveniently carried out in an autoclave or a tubular reactor.

The copolymers according to the invention may be made by saponification and re-esterification of the precursor copolymer.

Advantageously all, or substantially all, existing ester groups are hydrolysed and completely replaced by the desired ester substituents. While not wishing to be bound by any theory, it is believed that, in the course of hydrolysis, long chain branches containing carboxy groups are removed, and the linearity of the final vinyl ester polymers is greater than that of the precursor materials.

When the composition comprises polymers (i) and (ii), they are advantageously present in a weight ratio of from 15:1 to 1:10, preferably from 10:1 to 1:3, and more preferably from 7:1 to 1:1.

The additive composition and the oil composition may contain other additives for improving low temperature and/or other properties, many of which are in use in the art or known from the literature.

For example, the composition may also contain a further ethylene-vinyl ester copolymer. As mentioned above, with reference to U.S. Pat. No. 3,961,916, flow improver compositions may comprise a wax growth arrestor and a nucleating agent. Without wishing to be bound by any theory, the applicants believe that if the re-esterified copolymers of the present invention both have more than about 7.5 molar percent of ester units they act primarily as arrestors, and benefit from the addition of nucleators, e.g., an ethylene-vinyl ester, especially acetate, having a number average molecular weight in the range of 1200 to 20000, and a vinyl ester content of 0.3 to 12 molar percent, advantageously an ester content lower, and preferably at least 2, more preferably at least 3, molar percent lower, than that of any ester in the re-esterified copolymer composition.

If, however, the copolymers of the invention both contain less than about 10 molar percent of ester units then correspondingly they act primarily as nucleators and benefit from the presence of an arrestor which may be an ethylene/ unsaturated ester copolymer with correspondingly lower molecular weight and higher ester content.

It is of course in accordance with the invention to use an additional arrestor and/or nucleator when the composition of the invention contains re-esterified copolymers of both types (i) and (ii).

The additive composition may also comprise a comb polymer. Such polymers are discussed in "Comb-Like Polymers Structure and Properties", N. A. Platé and V. P. Shibaev, J. Poly. Sci. Macromolecular Revs., 8, p 117 to 253 (1974).

Advantageously, the comb polymer is a homopolymer having, or a copolymer at least 25 and preferably at least 40, more preferably at least 50, molar percent of the units of which have, side chains containing at least 6, and preferably at least 10, atoms.

As examples of preferred comb polymers there may be mentioned those of the general formula

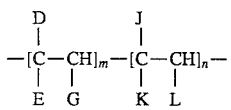

wherein

D=$R^{11}$, $COOR^{11}$, $OCOR^{11}$, $R^{12}COOR^{11}$, or $OR^{11}$,

E=H, $CH_3$, D, or $R^{12}$,

G=H or D

J=H, $R^{12}COOR^{11}$, or an aryl or heterocyclic group,

K=H, $COOR^{12}$, $OCOR^{12}$, $OR^{12}$, or COOH,

L=H, $R^{12}$, $COOR^{12}$, $OCOR^{12}$, COOH, or aryl, $R^{11} \geq C_{10}$ hydrocarbyl, $R^{12} \geq C_1$ hydrocarbyl, and m and n represent mole ratios, m being within the range of from 1.0 to 0.4, n being in the range of from 0 to 0.6. $R^{11}$ advantageously represents a hydrocarbyl group with from 10 to 30 carbon atoms, while $R^{12}$ advantageously represents a hydrocarbyl group with from 1 to 30 carbon atoms.

The comb polymer may contain units derived from other monomers if desired or required. It is within the scope of the invention to include two or more different comb copolymers.

These comb polymers may be copolymers of maleic anhydride or fumaric acid and another ethylenically unsaturated monomer, e.g., an α-olefin or an unsaturated ester, for example, vinyl acetate. It is preferred but not essential that equimolar amounts of the comonomers be used although molar proportions in the range of 2 to 1 and 1 to 2 are suitable. Examples of olefins that may be copolymerized with e.g., maleic anhydride, include 1-decene, 1-dodecene, 1-tetradecene, 1-hexadecene, and 1-octadecene.

The copolymer may be esterified by any suitable technique and although preferred it is not essential that the maleic anhydride or fumaric acid be at least 50% esterified. Examples of alcohols which may be used include n-decan-1-ol, n-dodecan-1-ol, n-tetradecan-1-ol, n-hexadecan-1-ol, and n-octadecan-1-ol. The alcohols may also include up to one methyl branch per chain, for example, 1-methylpenta-decan-1-ol, 2-methyltridecan-1-ol. The alcohol may be a mixture of normal and single methyl branched alcohols. It is preferred to use pure alcohols rather than the commercially available alcohol mixtures but if mixtures are used the $R^{12}$ refers to the average number of carbon atoms in the alkyl group; if alcohols that contain a branch at the 1 or 2 positions are used $R^{12}$ refers to the straight chain backbone segment of the alcohol.

These comb polymers may especially be fumarate or itaconate polymers and copolymers such for example as those described in European Patent Applications 153176, 153177 and 225688, and WO 91/16407.

Particularly preferred fumarate comb polymers are copolymers of alkyl fumarates and vinyl acetate, in which the alkyl groups have from 12 to 20 carbon atoms, more especially polymers in which the alkyl groups have 14 carbon atoms or in which the alkyl groups are a mixture of $C_{14}/C_{16}$ alkyl groups, made, for example, by solution copolymerizing an equimolar mixture of fumaric acid and vinyl acetate and reacting the resulting copolymer with the alcohol or mixture of alcohols, which are preferably straight chain alcohols. When the mixture is used it is advantageously a 1:1 by weight mixture of normal $C_{14}$ and $C_{16}$ alcohols. Furthermore, mixtures of the $C_{14}$ ester with the mixed $C_{14}/C_{16}$ ester may advantageously be used. In such mixtures, the ratio of $C_{14}$ to $C_{14}/C_{16}$ is advantageously in the range of from 1:1 to 4:1, preferably 2:1 to 7:2, and most preferably about 3:1, by weight.

Other suitable comb polymers are the polymers and copolymers of α-olefins and esterified copolymers of styrene and maleic anhydride, and esterified copolymers of styrene and fumaric acid; mixtures of two or more comb polymers may be used in accordance with the invention and, as indicated above, such use may be advantageous.

The additive composition may also comprise polar nitrogen compounds, for example those described in U.S. Pat. No. 4,211,534, especially an amide-amine salt of phthalic anhydride with two molar proportions of hydrogenated tallow amine, or the corresponding amide-amine salt of ortho-sulphobenzoic anhydride.

The additive composition of the invention may also comprise a copolymer of ethylene and at least one α-olefin, having a number average molecular weight of at least 30,000. Preferably the α-olefin has at most 20 carbon atoms. Examples of such olefins are propylene, 1-butene, isobutene, n-octene-1, isooctene-1, n-decene-1, and n-dodecene-1. The copolymer may also comprise small amounts, e.g, up to 10% by weight of other copolymerizable monomers, for example olefins other than α-olefins, and non-conjugated dienes. The preferred copolymer is an ethylene-propylene copolymer. It is within the scope of the invention to include two or more different ethylene-α-olefin copolymers of this type.

The number average molecular weight of the ethylene-α-olefin copolymer is, as indicated above, at least 30,000, as measured by gel permeation chromatography (GPC) relative to polystyrene standards, advantageously at least 60,000 and preferably at least 80,000. Functionally no upper limit arises but difficulties of mixing result from increased viscosity at molecular weights above about 150,000, and preferred molecular weight ranges are from 60,000 and 80,000 to 120,000.

Advantageously, the copolymer has a molar ethylene content between 50 and 85 percent. More advantageously, the ethylene content is within the range of from 57 to 80%, and preferably it is in the range from 58 to 73%; more preferably from 62 to 71%, and most preferably 65 to 70%.

Preferred ethylene-α-olefin copolymers are ethylene-propylene copolymers with a molar ethylene content of from 62 to 71% and a number average molecular weight in the range 60,000 to 120,000, especially preferred copolymers are ethylene-propylene copolymers with an ethylene content of from 62 to 71% and a molecular weight from 80,000 to 100,000.

The copolymers may be prepared by any of the methods known in the art, for example using a Ziegler type catalyst. The polymers should be substantially amorphous, since highly crystalline polymers are relatively insoluble in fuel oil at low temperatures.

The additive composition may also comprise a further ethylene-α-olefin copolymer, advantageously with a number average molecular weight of at most 7500, advantageously from 1,000 to 6,000, and preferably from 2,000 to 5,000, as measured by vapour phase osmometry. Appropriate α-olefins are as given above, or styrene, with propylene again being preferred. Advantageously the ethylene content is from 60 to 77 molar percent although for ethylene-propylene copolymers up to 86 molar percent by weight ethylene may be employed with advantage.

The composition may also comprise poly(ethylene glycol) esters, advantageously of fatty acids containing from 18 to 22 carbon atoms in the chain, especially when the fuel being treated lacks higher alkanes that act as wax crystallization nucleators.

In addition, the additive composition and the fuel oil composition may contain additives for other purposes, e.g., for reducing particulate emission or inhibiting colour and sediment formation during storage.

The fuel oil composition of the invention advantageously contains the re-esterified copolymers of the invention in a total proportion of 0.0005% to 1%, advantageously 0.001 to 0.1%, and preferably 0.0.4 to 0.06% by weight, based on the weight of fuel.

The following Examples, in which all parts and percentages are by weight, and number average molecular weights are measured by gel permeation chromatography, illustrate the invention.

EXAMPLE A

10 Kg (3.33 mole) of an ethylene-vinyl acetate copolymer containing 35% by weight vinyl acetate, Mn 3,000, degree of branching $4CH_3/100\ CH_2$, is charged into a flask equipped with a condenser and heated to 60° C. with stirring under a nitrogen blanket. 216 g (1 mole) of sodium methoxide in 1.5 l n-butanol is added cautiously to the polymer, and subsequently a further 4 l of n-butanol. The solution changes from clear to orange, and the temperature falls to 46° C. The mixture is then heated to 90° C., the colour turning to deep red, and maintained at that temperature with stirring for 2 hours.

The reaction mixture is then heated at 104° C., at a pressure of 370 mm Hg, to distil off approximately 4 l butyl acetate. The remaining viscous polymer is poured at 90° C. into an acidified (150 ml 36 wt% solution of HCl) solvent comprising 100 l water and 5 l acetone. The solution is stirred for 3 hours, and the solids allowed to settle overnight at pH 6. After draining, the polymer is filtered through a fine mesh cloth and dried at 70° C.

20 g of the resulting polymer (Mn 3300, 85% hydrolysed as determined by NMR) are dissolved in an anhydrous mixture of 100 ml toluene and 10 ml pyridine. 30 ml acetyl chloride dissolved in 100 ml toluene is added dropwise and the reaction mixture stirred for 1 hour at room temperature. The resulting solids are filtered off and solvent removed under vacuum to yield a viscous polymer. Further drying at 120° C. in vacuo to remove volatiles gives 21 g of a polymer, Mn 3300.

EXAMPLE B

The procedure of the first part of Example A was repeated, saponifying 450 g of an ethylene-vinyl acetate copolymer, 13.5% by weight vinyl acetate, Mn 5,000, degree of branching 6 $CH_3/100\ CH_2$, using 47.5 g sodium methoxide and a total 250 g n-butanol. 50 g of the resulting polymer (Mn 4000, 93% hydrolysis) are dissolved in an anhydrous solvent mixture comprising 375 ml toluene and 8 ml pyridine. 14 ml acetyl chloride in 250 ml toluene are added dropwise and the resulting mixture stirred for 5 hours at room temperature. The solids are filtered and solvent removed in vacuo to yield a viscous polymer which is further dried in vacuo at 120° C. to yield 38 g of a polymer (Mn 4000).

EXAMPLE C

The procedure of the first part of Example A was repeated, saponifying 100 g of an ethylene-vinyl acetate copolymer containing 29% by weight vinyl acetate, Mn 3,300, degree of branching $CH_3/100\ CH_2$:4, using 19.3 g sodium methoxide and 90 g n-butanol. Yield: 74 g; Mn 3000, 93% hydrolysis.

20 g of the resulting saponified polymer are dissolved in an anhydrous solvent comprising 150 ml toluene and 6 ml pyridine at room temperature. 10 ml acetyl chloride in 100 ml toluene are added dropwise and the reaction mixture stirred for 5 hours at room temperature. The product is dried as described in Example B, yielding 20 g of a similar polymer.

In the Examples below, Fuels 1 to 7 as listed in the following Table were employed. The CFPP of each fuel is measured as described in "Journal of the Institute of Petroleum", 52 (966), 173.

|  | Fuel | | | | | | |
| --- | --- | --- | --- | --- | --- | --- | --- |
|  | 1 | 2 | 3 | 4 | 5 | 6 | 7 |
| Cloud Point, °C. | −5 | −7 | −3 | −4 | +8 | −6 | −3 |
| S.G. | 0.838 | 0.834 | 0.846 | 0.830 | 0.866 | 0.845 | 0.846 |
| CFPP, °C. | −6 | −8 | −4 | −7 | +3 | −7 | −4 |
| IBP, °C. | 153 | 111 | 174 | 124 | 241 | 185 | 174 |
| FBP, °C. | 354 | 357 | 369 | 357 | 372 | 364 | 369 |
| 90–20 °C. | 105 | 126 | 110 | 118 | 67 | 78 | 110 |
| FBP–90 °C. | 24 | 31 | 26 | 31 | 19 | 35 | 26 |
| Wax at 10° C. below cloud point | 2.4 | 2.3 | 2.0 | 3.1 | 3.0 | 2.9 | 2.0 |

EXAMPLE 1

In this example, the effect of a composition comprising 3 parts by weight of the product of Example A and 1 part by weight of the product of Example B on the CFPP of various fuels was measured, and compared with the effect of the same concentration of a composition comprising the starting copolymer materials of these examples in the same proportions. The composition according to the invention is denoted "Product" while the comparison composition is denoted AB. It will be noted that the compositions are a blend of types (i) and (ii) polymers.

| Fuel No. | Treat Rate, ppm | CFPP, °C. Product | AB |
|---|---|---|---|
| 1 | 300 | −11 | −9 |
| 2 | 100 | −16 | −11 |
| 3 | 100 | −15 | −16 |
| 4 | 100 | −14 | −10 |
| 5 | 500 | −11 | −9 |

The results show that the effect of the composition of the invention is in general superior to that of the reference composition.

EXAMPLE 2

The procedure of Example 1 was repeated using as "Product" a blend of 3 parts by weight of the product of Example C and 1 part of the product of Example A, comparison similarly being made with the starting materials, these all being type (i) polymers. Also shown are the results using the individual precursor polymers, denoted A & C, the comparison blend being denoted AC. The composition of the invention is denoted Product, the individual re-esterified polymers as ReA and ReC. All blends and individual polymers were used at the treat rate indicated.

| Additive | CFPP, °C. - Fuel No. 6 Treat Rate, ppm 200 | 7 100 |
|---|---|---|
| A | −18 | −13 |
| ReA | −16 | −8 |
| C | −17 | −7 |
| ReC | −15 | −7 |
| AC | −17 | −7 |
| Product | −19 | −14 |

We claim:

1. A fuel oil composition comprising 0.0005 to 1% by weight of at least two different oil soluble re-esterified ethylene-vinyl ester copolymers, wherein each copolymer has been saponified and then re-esterified by:

a) at least partial hydrolysis to remove acid groups, and b) treatment with the same acid to restore at least partially the ester groups, such that the long chain branches of the copolymer are removed and the linearity of the final re-esterified copolymer is greater than that of the precursor copolymer and wherein each re-esterified copolymer contains units derived from ethylene and units of the formula $$—CH_2CROOCR^1— \qquad (I)$$

wherein R represents H or $CH_3$ and $R^1$ represents a hydrocarbyl group, and the molar proportion of ester units of the formula (I) of each copolymer is from 0.3 to 35 molar percent.

2. A composition as claimed in claim 1, wherein R represents H.

3. A composition as claimed in claim 1, wherein the ester units, or the units of the formula I, in the two polymers are the same.

4. A composition as claimed in claims 1 or 2, which comprises a polymer component (i) having from 7.5 to 35 molar percent of ester units or units of the formula I and a number average molecular weight (Mn) of at most 14,000.

5. A composition as claimed in claim 4, which comprises two polymer components (i).

6. A composition as claimed in 1 or 2, wherein both polymers are re-esterified ethylene-vinyl acetate copolymers.

* * * * *